Oct. 27, 1970  E. BRICHARD ET AL  3,536,470
GLASS MELTING TANK WITH BOTTOM COOLING SILL
Filed Jan. 27, 1967  2 Sheets-Sheet 1
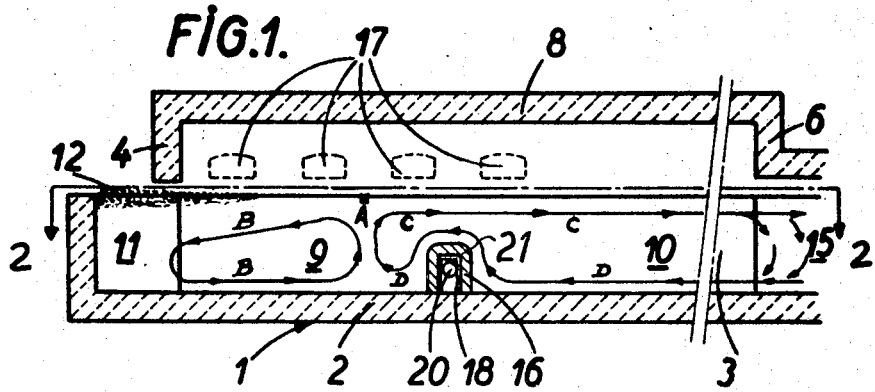
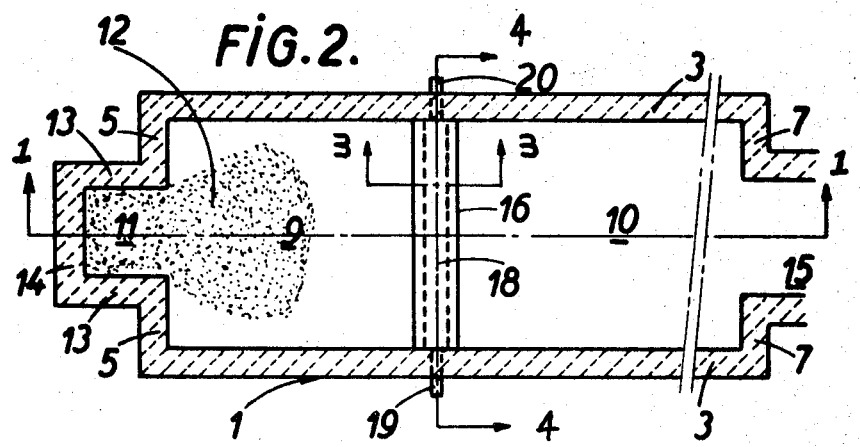
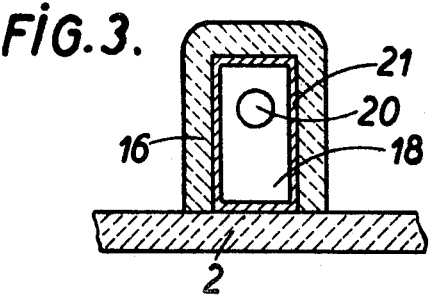
INVENTORS:
Edgard Brichard
Michel Lambert
BY Spencer & Kaye
ATTORNEYS

United States Patent Office 3,536,470
Patented Oct. 27, 1970

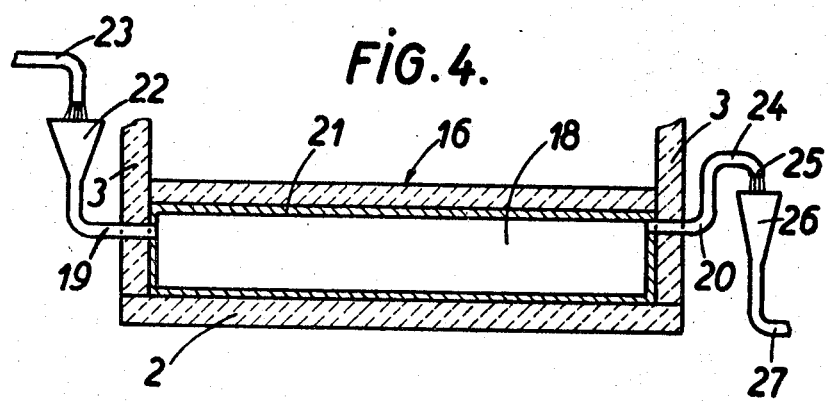
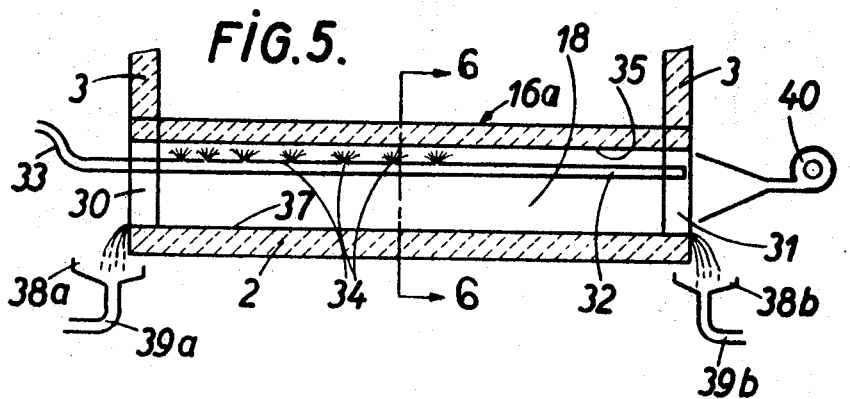
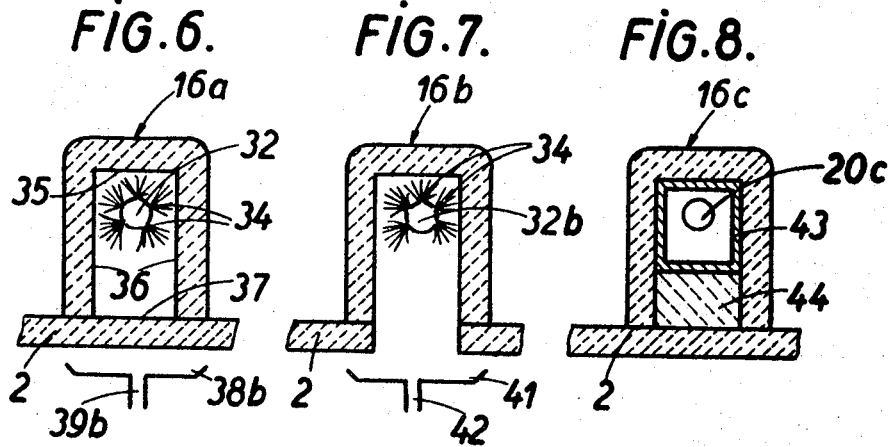

1

3,536,470
GLASS MELTING TANK WITH BOTTOM
COOLING SILL
Edgard Brichard, Jumet, and Michel Lambert, Charleroi,
Belgium, assignors to Glaverbel S.A., Brussels, Belgium
Filed Jan. 27, 1967, Ser. No. 612,244
Claims priority, application Luxembourg, Mar. 10, 1966,
50,619
Int. Cl. C03b 5/22
U.S. Cl. 65—337                                11 Claims

ABSTRACT OF THE DISCLOSURE

The amount of heat required to manufacture glass in a glass-melting tank furnace is reduced by providing a sill across the bottom of the tank furnace to retard convection currents in the molten glass contained therein and by cooling the sill to further retard the convection currents.

BACKGROUND OF THE INVENTION

This invention relates to the manufacture of glass in glass-melting tank furnaces. In conventional glass-melting tank furnaces, two main thermal currents can be identified in the be identified in the bath of molten glass, i.e., the surface current and the return current. The surface is formed by hot glass of relatively low density, and it moves from the melting zone of the tank furnace through the refining zone towards the withdrawal end where glass is withdrawn for working. Only a small amount of glass in the surface current is withdrawn at any given time. The remaining glass in the surface current cools so that its density increases, and the glass drops to the lower levels of the bath to join the return current, which flows back towards the so-called "hot spot" of the tank furnace. In the heating zone of the tank furnace, the glass forming the return current becomes heated, rises to the surface at the "hot spot" and starts to circulate again in the surface current. Obviously, this continual reheating and recycling of a mass of molten glass in the tank is undesirable because it involves very high fuel consumption.

An attempt has been made in the past to reduce fuel consumption by providing a transverse wall on the bottom of the tank furnace across the path of the return current. The effect of this wall, which will be called the "sill," is to reduce the amount of glass flowing back to the "hot spot" from the withdrawal end of the tank, and, thus to reduce the amount of heat which has to be supplied to the bath at the melting zone. A reduction in the return current reduces the surface current by the same amount, since the surface current and return current together, constitute a single convection current.

SUMMARY OF THE INVENTION

The object of this invention is to provide a method and apparatus for further reducing the amount of heat required to manufacture glass in glass-melting tank furnaces. In accordance with this invention, it has been found that heat consumption can be further reduced by cooling the sill. This step might be expected to have the reverse effect, since cooling the sill involves withdraal of heat from the melting zone, but in fact, although a withdrawal of heat does occur, the effect on the overall heat balance is more than offset by a reduction of heat transfer through the sill from glass in the melting zone to the glass in the return current flowing up to the sill, and this significantly retards the return current flow over the sill, thus reducing the overall convection current.

Accordingly, the present invention includes a glass manufacturing process wherein batch is melted in glass-

2 melting tank furnace provided with a transverse sill across the path of glass to retard the return current at the bottom of the tank, and wherein a coolant is applied to the interior of the sill to reduce heat transfer through the sill from glass in the melting zone to glass on the opposite side of the sill thereby further retarding the return current. The invention also includes a glass-melting tank furnace wherein the bottom portion of the tank is provided with a sill over which glass in the return current at the bottom of the tank must flow in order to reach the "hot spot" when the furance is in operation; the sill being constructed so that a coolant can be supplied to the interior thereof, and wherein means is provided for continuously supplying coolant to the interior of the sill during the operation of the furnace.

When the furnace is operated, the rate of heat transfer (if any) through the sill can be controlled by controlling the rate at which the coolant is supplied thereto.

The construction of the sill and the means for supplying coolant thereto are preferably arranged to provide a substantial difference in temperature between the sill surfaces facing the batch feed end and the withdrawal end of the tank. The sill or an upper part thereof may be hollow and may be connected to inlet and outlet conduits so that the hollow interior can be kept filled with liquid coolant in flow between the inlet and outlet conduits. In this case, it is preferable, in order to prevent the coolant from diffusing through the refractory material of the sill, to line the interior of the sill with a fluid-tight metal lining.

In the preferred embodiment of the invention, a spray pipe is located in the interior of the sill for spraying coolant against one or more interior surfaces of the sill. When this construction is adopted, there is no need to line the interior of the sill with a fluid-tight lining. The interior of the sill may be open to the atmosphere at the ends of the sill or at the bottom thereof to enhance the cooling action of the spray, and means is provided to drain the spray coolant from the interior of the sill.

BRIEF DESCRIPTION OF THE DRAWINGS

FIG. 1 is a longitudinal vertical sectional view of a glass-melting tank furnace taken substantially along the plane defined by reference line 1—1 of FIG. 2.

FIG. 2 is a horizontal sectional view taken substantially along the plane defined by reference line 2—2 of FIG. 1.

FIG. 3 is a vertical sectional view of a first sill structure taken substantially along the plane defined by reference line 3—3 of FIG. 2.

FIG. 4 is a vertical sectional view of the first sill structure taken substantially along the plane defined by reference line 4—4 of FIG. 2.

FIG. 5 is a vertical sectional view of a second sill structure of this invention.

FIG. 6 is a vertical sectional view of the second sill structure taken substantially along the plane defined by reference line 6—6 of FIG. 5.

FIG. 7 is a vertical sectional view of a third sill structure of this invention.

FIG. 8 is a vertical sectional view of a fourth sill structure of this invention.

DESCRIPTION OF THE PREFERRED EMBODIMENTS

Referring to FIGS. 1 and 2, a tank furnace 1 is formed by a tank 2, side walls 3, upstream end walls 4, and 5, downstream end walls 6 and 7 and a top 8. The tank furnace 1 contains a melting zone 9 and a refining zone 10. The melting zone 9 is preceded by a charging zone 11 bounded by walls 13 and 14 which receives a batch 12. At the end of the refining zone 10 is a canal 15 supplying the glass forming machines (not shown). A sill 16 is disposed on the tank bottom 2 and extends over the whole tank width. The glass is heated by burners 17 extending through the walls 3 and so controlled that the hot spot, i.e., the hottest place in the tank, is at location A.

Thermal currents are set up on either side of the hot spot A. A first current upstream of the hot spot A follows a circuit shown diagrammatically by arrows B. A second current downstream of the hot spot A flows forwardly as shown by the arrows C towards the withdrawal zone. As it advances, glass in this forward surface current gradually cools down and a considerable amount of it drops into the lower region of the tank to form a return current D which flows back towards the hot spot via the sill 16. At the hot spot A the glass of the return current D becomes reheated and rises to the surface to join the surface current and start the same cycle all over again. The surface current and return current, taken together, constitute a convection current which wastes fuel. The effect of the sill is to reduce the amount of glass which flows back to the hot spot and therefore reduce the amount of heat consumed in reheating glass of the return current.

The sill 16 is formed with a longitudinal interior passage 18 through which a coolant, for instance water, is circulated via a feed pipe 19 and a discharge pipe 20. At least one of the pipes 19 and 20 is flush with the inside surface of the top wall of the sill to prevent the formation of air pockets therein. In order to prevent any risk of coolant penetrating into the molten glass bath through the refractory material of the sill, the interior of the sill is provided with a lining box 21 (FIG. 3) made of fluid-impervious material.

As shown in FIG. 4, the feed pipe 19 extends from a funnel 22 disposed above the level of the top wall of the box 21. Liquid coolant is poured into this funnel from a pipe 23. The discharge pipe 20 terminates in a bent portion 24 so that its discharge end 25 is above the level of the top wall of the box 21. A funnel 26 connected to a pipe 27 collects the water flowing from the bent portion 24 after passing through the box 21. This method of feeding the coolant prevents the pressure inside the box 21 from rising excessively as a result of obstructions in the discharge pipe 20.

FIGS. 5 and 6 show a second sill structure 16a which is open at both ends 30 and 31. A spray conduit 32 extends along the interior of the sill. The conduit is closed at one of its ends, the other end being connected to a supply pipe 33. Apertures 34 are formed in the conduit wall opposite the interior top and side surfaces 35 and 36 of the sill. Coolant forced into the conduit 32 discharges through the apertures 34 onto the interior surfaces 35 and 36 and flows to the sill bottom 37, from which it is collected by gutters 38a and 38b connected to pipes 39a and 39b. The inside of the sill is at atmospheric pressure, and there is no need to provide a metal lining box. Moreover, the flow of air along the interior of the sill, forced if required by a fan 40, intensifies the cooling action of the water by speeding evaporation.

The sill 16b shown in FIG. 7 is open at both ends and at its base. Water is sprayed against inside surfaces of the sill from a spray pipe 32b and is collected by a tank 41 disposed beneath the sill and connected to a pipe 42.

In certain tank furnaces it may be sufficient to limit the cooling of the sill to its upper portion. This is so, for instance, when melting a glass which has a low coefficient of heat transfer so that the temperatures of the bottom layers of glass are relatively low.

FIG. 8 shows a sill 16c suitable for use in such cases. The top part of the sill houses a lining box 43 to which a pipe 20c is connected for the evacuation of the coolant. Beneath the lining box there is a refractory body 44.

It will be understood that the above description of the present invention is susceptible to various changes, modifications, and adaptations, and the same are intended to be comprehended within the meaning and range of equivalents of the appended claims.

What is claimed is:

1. A glass-melting tank furnace comprising, in combination:
   a melting tank including a bottom and a plurality of walls, including side walls, attached thereto for containing a bath of molten glass, the tank having a charging end and a withdrawal end;
   heating means for providing a hot spot at a point intermediate between the charging end and the withdrawal end;
   a sill on the bottom and extending across the bottom of said tank between the side walls thereof and at a position spaced from the point and intermediate between said point and said withdrawal end; and
   cooling means for cooling the sill to retard said convection current.

2. A furnace according to claim 1 wherein the cooling means is provided by the sill being a hollow sill having an interior surface and said sill has means for applying liquid coolant to the interior surface thereof.

3. A furnace according to claim 2 wherein the interior of said sill contains a flow passage which is connected to supply and discharge pipes for circulating the coolant through the flow passage.

4. A furnace according to claim 3 wherein said flow passage is lined with a fluid-impervious material to prevent leakage of said coolant.

5. A furnace according to claim 2 wherein at least one spray outlet is located in the interior of said sill for spraying coolant against the interior surface of the sill and wherein there are means for draining the sprayed coolant from the interior of said sill.

6. A furnace according to claim 5 wherein said interior surface is exposed to contact with the atmosphere.

7. A furnace according to claim 2 wherein the interior of said sill is open at its base to the atmosphere.

8. A furnace according to claim 2 wherein the liquid coolant is water.

9. A furnace according to claim 2 having coolant supply means to deliver the liquid coolant to the interior surface of the sill.

10. A glass-melting tank furnace comprising, in combination:
    a melting tank including a bottom and a plurality of walls, including side walls, attached thereto for containing a bath of molten glass, the tank having a charging zone, and a withdrawal zone, heating means and current flow retarding means;
    the charging zone and the withdrawal zone being at opposite ends of the tank;
    the heating means being sufficient to maintain in molten state glass contained in the tank, said heating means producing two thermal currents in such molten glass, the two currents meeting at an intermediate position between the charging zone and the withdrawal zone;
    one of the thermal currents is a counterclockwise upstream current and the other, which is essentially separate and distinct from the upstream current, is a downstream clockwise current wherein flow moves downstream along the surface of the molten glass and returns upstream along the tank bottom;
    the current flow retarding means is on the bottom of the tank, transverse to the return flow of the downstream current, and directly retards essentially only said return flow in a position removed from that at which the two currents meet and intermediate between said position at which the two currents meet and said withdrawal zone, said retarding means including cooling means.

11. In a glass-melting tank furnace comprising a bottom, side and end walls, a charging end, a withdrawal end, heating means and a bath of molten glass; wherein the bottom, side and end walls defined the glass melting tank which contains the bath of molten glass, the charging end and the withdrawal end being at opposite ends of the tank;
> the heating means producing two thermal currents in the bath of molten glass, the two currents consisting essentially of an upstream counterclockwise current and a downstream clockwise current which meet at a place between the charging end and the withdrawal end;
>
> the downstream current comprising downstream surface flow in the bath of molten glass and upstream return flow along the bottom of said glass melting tank;
>
> the improvement consisting essentially of flow retarding means on the bottom of the tank and between the side walls thereof, the flow retarding means directly retarding essentially only the upstream return flow along the bottom of said glass melting tank at a position removed from the place at which said two currents meet and intermediate between the said place and the withdrawal end, said flow retarding means being provided with cooling means for cooling said retarding means to retard said upstream return flow.

References Cited
UNITED STATES PATENTS

| | | | |
|---|---|---|---|
| 2,068,925 | 1/1937 | Mulholland | 65—347 XR |
| 2,119,949 | 6/1938 | Blau et al. | 65—134 |
| 3,218,144 | 11/1965 | Touvay | 65—337 XR |
| 3,265,485 | 8/1966 | Carney et al. | 65—337 XR |

FRANK W. MIGA, Primary Examiner

U.S. Cl. X.R.

65—134, 335, 346, 347, 356